GREELEY & BUXTON.
Mower.
No. 39,286.
Patented July 21, 1863.
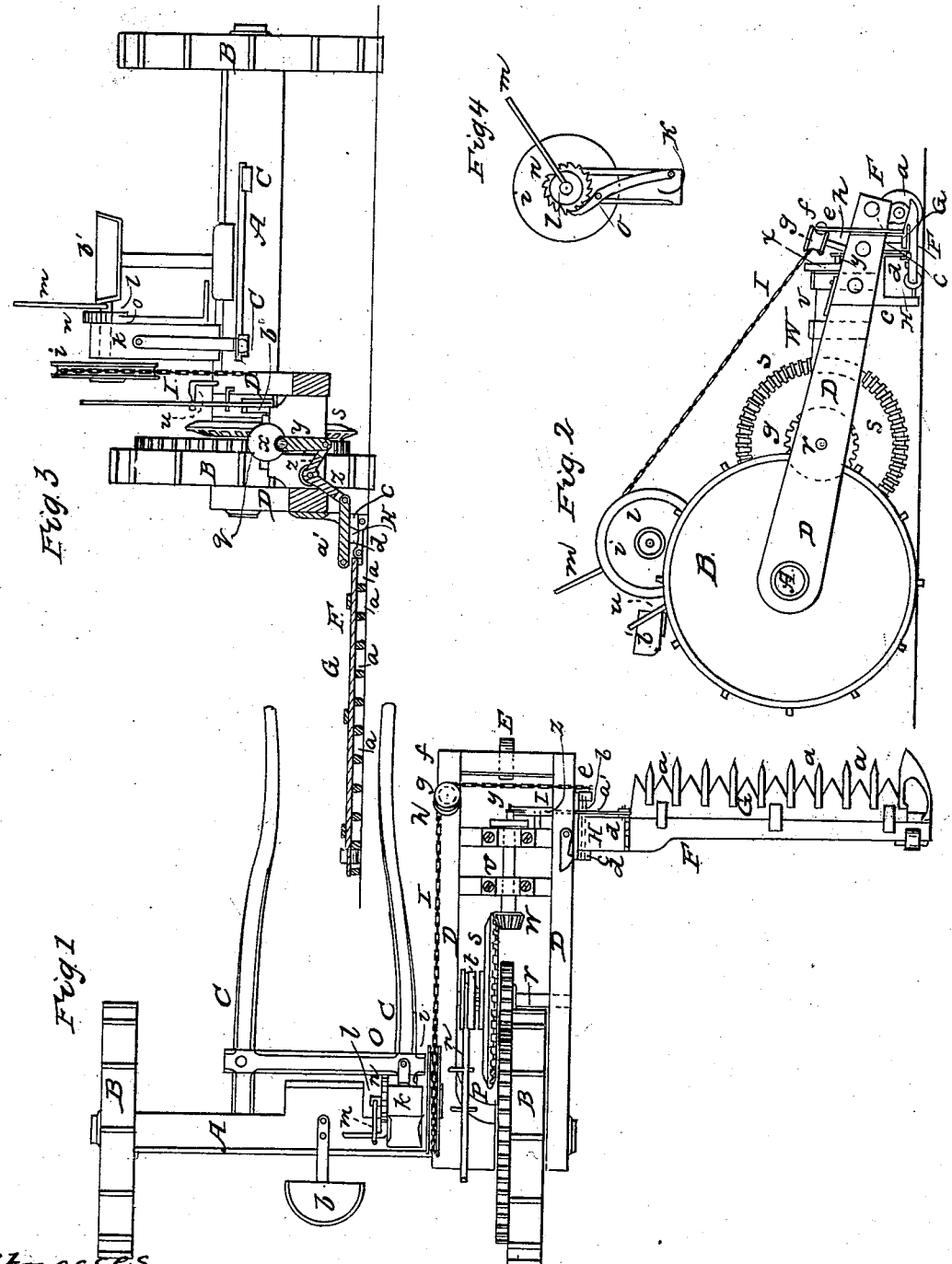

UNITED STATES PATENT OFFICE.

JOHN P. GREELEY AND LEVI W. BUXTON, OF NASHUA, NEW HAMPSHIRE.

IMPROVEMENT IN MOWING-MACHINES.

Specification forming part of Letters Patent No. 39,286, dated July 21, 1863.

*To all whom it may concern:*

Be it known that we, JOHN P. GREELEY and LEVI W. BUXTON, residents of Nashua, in the county of Hillsborough and State of New Hampshire, have invented an Improved Mowing-Machine; and we do hereby declare the same to be fully described in the following specification and represented in the accompanying drawings, of which—

Figure 1 is a top view, and Fig. 2 a side elevation, of it. Fig. 3 is a vertical section taken longitudinally through the cutter-bar. Fig. 4 is a side view of the chain-wheel, its lever, and retaining mechanism, to be hereinafter described.

By means of our invention we gain such a complete control of the cutter-bar while the machine may be at work as to enable us to either raise its outer end more or less with respect to the inner end of it, but also, as occasion may require, to elevate both ends alike. In this way we are enabled to pass over obstacles which may be presented in the path of the machine while it may be at work, and which could not be so passed were the cutter-bar only capable of being moved radially upward or downward on a center or joint. The arrangement of the cutter-bar relatively to the axle and thills of the machine is such as to enable the driver to see to great advantage any obstacle in the path or way of such bar, and to control such bar with great convenience while the machine may be in operation.

In the drawings, A represents an axle provided with two wheels, B B, and a pair of thills, C C. Each of the wheels is to revolve freely on the axle. A frame, D, extends from the axle at right angles and turns at one end freely in vertical directions thereon, it being arranged alongside of one of the thills, as shown in Fig. 1. At its front end the said frame D has a wheel, E, for supporting the frame, the wheel resting and running on the ground while the machine may be in use.

The cutter-bar F, furnished with a series of teeth or prongs, $a\ a\ a$, and a serrated cutter, G, projects laterally from the front part of the frame D in manner as shown in Fig. 1, and is connected to such frame by a lever, H, whose fulcrum is a shaft, $b$, supported within a bracket, $c$, which extends down from or makes part of the frame D. The cutter-bar is hinged to the inferior arm $d$ of the lever H, as shown at $d'$, the said arm being made to extend a short distance forward underneath the cutter-bar in manner as shown in Fig. 3. The longer arm $e$ of the lever H stands nearly upright and has one end of a chain, I, affixed to it. The said chain goes through a guide, $f$, and partially around a pulley, $g$, carried by a post, $h$, which extends upward from the frame D. From the pulley $g$ the chain extends toward and is fastened to the grooved periphery of a windlass or pulley, $i$, whose shaft $l$ is supported by means of and so as to be capable of revolving in a post, $k$, projecting upward from the axle. An arm or hand-lever, $m$, extends forward from the inner end of the said shaft $l$ and at right angles therewith. Furthermore, the shaft carries a ratchet, $n$, provided with a lever or retaining-pawl, $o$, whose fulcrum projects from the post $k$, the lower arm of the said lever $o$ being bent so as to enable the driver to place his foot on it for the purpose of conveniently moving by it the pawl either toward or away from the periphery of the ratchet.

Affixed to the inner side of that wheel B which is within the frame D is a driving-gear, $p$, which engages with a pinion, $q$, applied to a shaft, $r$, carried by the frame D. A bevel-gear, $s$, runs freely on the shaft $r$, which is provided with a clutch, $t$, by which the said bevel-gear may be so clutched to the shaft as to be revolved with and by it. A lever, $u$, arranged as shown in Fig. 1, serves to operate this clutch. Another shaft, $v$, arranged longitudinally within and supported by the frame D, carries at one end a beveled pinion, $w$, to engage with the gear $s$, while at its other end it has a crank-wheel, $x$, which, by means of a connecting-rod, $y$, is jointed to and operates a right-angular lever, $z$. Another connecting-rod, $a'$, joins the said lever $z$ to the rear end of the serrated cutter G. By means of mechanism as described the said cutter-bar has a reciprocating rectilinear motion imparted to it during revolution of that driving-wheel B which is within the frame D.

The machinery for supporting the cutter-bar and that for operating its cutter will admit of the said cutter-bar being turned from a horizontal up into a vertical or nearly upright position, or vice versa; and, furthermore, by means of the lever H, the chain I, and the endless pulley $i$, arranged and combined with the cutter-bar F, the frame D, and the axle A, in manner substantially as described, the driver, while sitting on the seat $b'$, projecting from the axle, not only can control the cutter-bar so as to raise it radially and at its outer end, but he can also raise it at both ends simultaneously and to great advantage, the power to effect such being applied by him to the lever *m*. On raising the frame D it will be sustained in position by means of the ratchet *n* and pawl-lever *o*.

Having described our improved machine for cutting grass, &c., what we claim, and desire to have secured to us by Letters Patent, is as follows:

The said improved mowing-machine, so constructed as not only to have its axle A and its cutter-bar F connected by means of a vibratory frame D, arranged with respect to and applied to them and serving to support the cutter-operating mechanism, substantially as described, but also to have combined with the cutter-bar frame and axle a lever, H, a chain, I, a pulley, *g*, and a windlass or wheel, *i*, and mechanism for operating or rotating such wheel and retaining it in position, the whole being substantially as hereinbefore specified.

JOHN P. GREELEY.
LEVI W. BUXTON.

Witnesses:
R. H. EDDY,
F. P. HALE, Jr.